（12）United States Patent
Nagashima et al.

(10) Patent No.: US 7,740,697 B2
(45) Date of Patent: Jun. 22, 2010

(54) AQUEOUS INK, INK CARTRIDGE USING THE SAME, INKJET PRINTING METHOD AND RECORDED MATTER

(75) Inventors: Akira Nagashima, Tokyo (JP); Shinichi Hakamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 805 days.

(21) Appl. No.: 11/141,239

(22) Filed: Jun. 1, 2005

(65) Prior Publication Data

US 2005/0204955 A1  Sep. 22, 2005

Related U.S. Application Data

(63) Continuation of application No. PCT/JP2004/018867, filed on Dec. 10, 2004.

(30) Foreign Application Priority Data

Dec. 11, 2003  (JP)  ............................. 2003-412848

(51) Int. Cl.
 *C09D 11/00* (2006.01)
(52) U.S. Cl. ............... 106/31.59; 106/31.58; 106/31.89; 106/31.86
(58) Field of Classification Search ............... 106/31.59, 106/31.89, 31.58, 31.86
See application file for complete search history.

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 5,078,790 A | 1/1992 | Tochihara et al. | 106/20 |
| 5,080,716 A | 1/1992 | Aoki et al. | 106/20 |
| 5,116,409 A | 5/1992 | Moffatt | 106/22 |
| 5,226,957 A | 7/1993 | Wickramanayake et al. | 106/25 R |
| 5,258,066 A | 11/1993 | Kobayashi et al. | 106/22 R |
| 5,345,254 A | 9/1994 | Wong et al. | 347/100 |
| 5,397,386 A | 3/1995 | Nakazawa et al. | 106/22 K |

(Continued)

FOREIGN PATENT DOCUMENTS

EP   0 892 025 A1   1/1999

(Continued)

*Primary Examiner*—Jerry Lorengo
*Assistant Examiner*—Veronica Faison Gee
(74) *Attorney, Agent, or Firm*—Fitzpatrick, Cella, Harper & Scinto

(57) ABSTRACT

The invention provides an ink which has a higher fixation of a recorded matter, is more excellent in stability and reliability of the ink, and allows a recorded matter of high image quality to be obtained stably, a recorded image, an inkjet recording method, and devices using such an ink. The invention provides an aqueous ink including micromicelles which are dispersed in a transparent single phase in water, characterized in that the micromicelles are comprised of a combination of two or more surfactants which exhibit an opaque or translucent dispersed state in water and a compound having an alkyl group and having only a hydroxyl group as a water-soluble group, and an inkjet recording method, devices and a recorded image, using the aqueous ink.

15 Claims, 5 Drawing Sheets

U.S. PATENT DOCUMENTS

| | | | |
|---|---|---|---|
| 5,492,559 A | 2/1996 | Oliver et al. | 106/22 E |
| 5,746,818 A * | 5/1998 | Yatake | 106/31.86 |
| 5,749,952 A | 5/1998 | Tsang et al. | 106/31.64 |
| 5,886,065 A | 3/1999 | Tsang et al. | 523/161 |
| 5,891,934 A | 4/1999 | Moffatt et al. | 523/161 |
| 6,019,827 A | 2/2000 | Wickramanayake et al. | 106/31.25 |
| 6,034,153 A | 3/2000 | Tsang et al. | 523/160 |
| 6,076,919 A | 6/2000 | Shirota et al. | 347/60 |
| 6,342,094 B1 | 1/2002 | Kabalnov | 106/31.25 |
| 6,354,698 B1 | 3/2002 | Tachihara et al. | 347/56 |
| 6,461,418 B1 * | 10/2002 | Yue et al. | 106/31.58 |
| 6,676,734 B2 * | 1/2004 | Nagashima et al. | 106/31.32 |
| 6,830,612 B1 * | 12/2004 | Yatake et al. | 106/31.58 |
| 6,890,378 B2 * | 5/2005 | Yatake et al. | 106/31.59 |
| 2004/0027404 A1 | 2/2004 | Nagashima et al. | 347/8 |
| 2004/0231554 A1 | 11/2004 | Udagawa et al. | 106/31.15 |
| 2005/0052515 A1 | 3/2005 | Udagawa et al. | 347/100 |
| 2005/0088501 A1 | 4/2005 | Nagashima et al. | 347/100 |
| 2005/0109952 A1 | 5/2005 | Udagawa et al. | 250/461.1 |
| 2005/0195243 A1 | 9/2005 | Nagashima et al. | 347/54 |
| 2005/0219341 A1 | 10/2005 | Nito et al. | 347/100 |
| 2006/0000386 A1 | 1/2006 | Hakamada et al. | 106/31.13 |
| 2006/0007288 A1 | 1/2006 | Takada et al. | 347/100 |
| 2006/0007289 A1 | 1/2006 | Nito et al. | 347/100 |
| 2006/0012657 A1 | 1/2006 | Nagashima et al. | 347/100 |
| 2006/0021545 A1 | 2/2006 | Nagashima et al. | 106/31.27 |

FOREIGN PATENT DOCUMENTS

| | | |
|---|---|---|
| JP | 59-123670 | 7/1984 |
| JP | 5-125313 | 5/1993 |
| JP | 5-132643 | 5/1993 |
| JP | 6-9911 | 1/1994 |
| JP | 6-220376 | 8/1994 |
| JP | 6-256696 | 9/1994 |
| JP | 8-183921 | 7/1996 |
| JP | 9-217031 | 8/1997 |
| JP | 9-279067 | 10/1997 |
| JP | 10-130551 | 5/1998 |
| JP | 10-140058 | 5/1998 |
| JP | 10-265727 | 10/1998 |
| JP | 11-71543 | 3/1999 |
| JP | 11-188870 | 7/1999 |
| JP | 2962880 B | 8/1999 |
| JP | 2001-262026 | 9/2001 |
| JP | 3246949 B | 11/2001 |
| JP | 2003-112437 | 4/2003 |
| JP | 2003-246952 | 9/2003 |
| JP | 2003-253599 | 9/2003 |
| JP | 2004-18689 | 1/2004 |
| JP | 2004-67710 | 3/2004 |

* cited by examiner

| HYDROPHOBIC UNIT: | ■ | < | □ | |
|---|---|---|---|---|
| | | (MORE HYDROPHOBIC→) | | |
| HYDROPHILIC UNIT: | ● | < | ○ | < ◎ |
| | | | (MORE HYDROPHILIC→) | |

| HYDROPHOBIC UNIT: | ■ | < | □ | |
|---|---|---|---|---|
| | | (MORE HYDROPHOBIC→) | | |
| HYDROPHILIC UNIT: | ● | < | ○ | < ◎ |
| | | | (MORE HYDROPHILIC→) | |

| HYDROPHOBIC UNIT: | ■ < □ |
| | (MORE HYDROPHOBIC→) |
| HYDROPHILIC UNIT: | ● < ○ < ◎ |
| | (MORE HYDROPHILIC→) |

| HYDROPHOBIC UNIT: | ■ < □ |
| | (MORE HYDROPHOBIC→) |
| HYDROPHILIC UNIT: | ● < ○ < ◎ |
| | (MORE HYDROPHILIC→) |

HYDROPHOBIC UNIT: ■ < □
(MORE HYDROPHOBIC→)

HYDROPHILIC UNIT: ● < ○ < ◎
(MORE HYDROPHILIC→)

HYDROPHOBIC UNIT: ■ < □
(MORE HYDROPHOBIC→)

HYDROPHILIC UNIT: ● < ○ < ◎
(MORE HYDROPHILIC→)

HYDROPHOBIC UNIT: ■ < □
(MORE HYDROPHOBIC→)

HYDROPHILIC UNIT: ● < ○ < ◎
(MORE HYDROPHILIC→)

HYDROPHOBIC UNIT: ■ < □
(MORE HYDROPHOBIC→)

HYDROPHILIC UNIT: ● < ○ < ◎
(MORE HYDROPHILIC→)

AQUEOUS INK, INK CARTRIDGE USING THE SAME, INKJET PRINTING METHOD AND RECORDED MATTER

This application is a continuation of International Application No. PCT/JP2004/018867, filed on Dec. 10, 2004, which claims the benefit of Japanese Patent Application No. 2003-412848 filed on Dec. 11, 2003.

BACKGROUND OF THE INVENTION

1. Field of the Invention

The present invention relates to an aqueous ink (hereinafter also referred to as ink), an inkjet printing method using the aqueous ink, a recorded matter obtained by the printing method, and devices using such an ink. More particularly, the present invention relates to a technique for making practical a surfactant which cannot be used or can be used only in a very small amount in an ink under normal conditions due to its low HLB (a surfactant which is very poor in solubility in an ink, and is separated and precipitated in a state in which an ink containing the surfactant is stored).

2. Related Background Art

Various studies and reports have been made for inks for use in writing implements and inks for inkjet recording for the purpose of improving image quality of the obtained recorded matter and fixation and reliability of the ink. For example, as methods for improving fixation of a recorded matter, a method in which water-soluble alcohol is incorporated in an aqueous ink, a method in which a highly hydrophobic water-soluble organic solvent, e.g., cellosolve is incorporated in an aqueous ink, and the like have been proposed. However, incorporation of the above compounds in an ink in a large amount improves fixation but degrades quality of a recorded matter. Moreover, use of the above compounds may cause problems as to inflammability of an ink and safety of human bodies.

On the other hand, a method in which a water-soluble surfactant is incorporated in an ink to improve fixation of a recorded matter is proposed in Japanese Patent Application Laid-Open No. H5-132643. It can be said that this method is preferable in terms of safety, but the viscosity of an ink increases as the content of the surfactant in the ink is increased for improving fixation of the recorded matter. For example, if the method is used for an inkjet printing method, reliability including ink ejection is impaired. If the surfactant is added in an ink in a large amount for further improvement of fixation, the ink may spread on the surface of a recording medium to degrade image quality of the obtained recorded matter.

On the other hand, it is proposed in Japanese Patent Application Laid-Open No. H6-256696 and Japanese Patent Application Laid-Open No. 2003-253599 that a hydrophilic surfactant is used in conjunction with a highly hydrophobic surfactant to improve fixation of a recorded matter. However, the amount of such a highly hydrophobic surfactant capable of being used in an ink is very small. Thus, fixation cannot be considerably improved compared to the conventional method using a water-soluble surfactant.

In Japanese Patent Application Laid-Open No. H11-71543, Japanese Patent Application Laid-Open No. H8-183921, Japanese Patent Application Laid-Open No. H6-9911, Japanese Patent Application Laid-Open No. H6-220376, Japanese Patent Application Laid-Open No. H10-140058, Japanese Patent Application Laid-Open No. H5-125313, Japanese Patent Application Laid-Open No. H10-265727, Japanese Patent Application Laid-Open No. H9-279067, Japanese Patent Application Laid-Open No. H9-217031, Japanese Patent Application Laid-Open No. H6-256696, Japanese Patent Application Laid-Open No. H10-130551 and Japanese Patent Application Laid-Open No. 2001-262026, various propositions are made for the method in which a hydrophobic compound is used in an ink. Among them, in Japanese Patent Application Laid-Open No. H11-71543, it is proposed that a water-insoluble material such as water-insoluble ethylene oxide, propylene oxide oil, water-insoluble alcohol or water-insoluble aldehyde is dissolved using an acid such as benzoic acid or xylene sulfonic acid, salt thereof, resorcin or the like, and using a co-solvent such as 2-pyrrolidone or glycol ester as required. However, in the above proposition, a water-insoluble material is dissolved using an acid or salt thereof, ester compound or polar compound, and therefore undesirable effects are produced on safety of human bodies, and solutes of internal additives and the like emerge in a member contacting an ink from the member to produce undesirable effects on stability and reliability of the ink. Moreover, if the acid or salt thereof is used in a large amount, precipitation easily occurs in the ink, or around an ink eject hole in the case of the inkjet recording method, for example, and thus reliability of the ink or in recording is impaired. Especially in the inkjet recording method, the influence may be significant because the size of ejected ink droplets is small.

SUMMARY OF THE INVENTION

Further studies on the propositions in Japanese Patent Application Laid-Open No. H6-256696 and Japanese Patent Application Laid-Open No. 2003-253599 described above reveal that use of a highly hydrophobic surfactant in conjunction with a similar surfactant also has a problem such that the highly hydrophobic surfactant is easily separated from an ink due to a change in environment of the ink, for example a change in temperature. The highly hydrophobic surfactant forms micelles with the other surfactant which is hydrophilic, whereby it is apparently dissolved in the ink, but the clouding point of such a system is lower than that of a system where only the hydrophilic surfactant used in conjunction would be used. That is, due to use of the highly hydrophobic surfactant, an environment of unstable temperature of the surfactant occurs at a low temperature, and thus the highly hydrophobic surfactant is easily separated in ink or deposited on a member or the like contacting the ink to impair reliability and stability.

In addition, in recent years, an ink showing a further improvement in fixation has found a wider range of applications with speedups in recording techniques, and development of an ink excellent in stability and reliability of the ink and allowing a recorded matter excellent in image quality to be stably obtained, and an inkjet recording method, are desired.

Thus, an object of the present invention is to solve the above problems and provide an ink which has a higher fixation of a recorded matter, is excellent in stability and reliability of the ink, and allows a recorded matter excellent in image quality to be stably obtained, and an inkjet recording method, and devices using such ink.

Another object of the present invention is to provide a technique which makes it possible to use in a large amount a surfactant having a low HLB (a surfactant which is very poor in solubility in an ink, and is separated and precipitated in a state in which the ink containing the surfactant is stored).

Still another object of the present invention is to provide an ink capable of dissolving or dispersing stably a surfactant therein which improves fixation of the ink on a recording medium but is very poor in stability of dissolution or dispersion in the ink, and thus has been rarely used previously, and increasing the content of the surfactant, thereby making it possible to improve fixation of the ink on the recording medium and improving the quality of an obtained recorded image, an inkjet recording method and devices using such ink.

The above objects are achieved by the present invention described below. That is, the present invention is an aqueous ink characterized by comprising micromicelles comprised of: at least two surfactants forming micelles in an opaque or translucent dispersed state in water when used in conjunction; and a compound having an alkyl group less hydrophobic than each of the above described surfactants, and having only a hydroxyl group as a water-soluble group. According to the present invention, unlike the previously adopted method in which a surfactant having a high solubility is added to an ink, a surfactant having a low solubility is stably dispersed in the ink in a micromicelle form as if it were dissolved, whereby the aqueous ink containing micromicelles has considerably improved fixation of a recorded matter, and an ink excellent in stability and reliability of the ink and allowing a recorded matter excellent in image quality to be stably obtained, an inkjet recording method and devices using such ink can be provided.

It is preferable that the two or more surfactants include a first surfactant having an HLB equal to or greater than 6 and less than 10 and a second surfactant having an HLB of 10 to 15, wherein said first and second surfactants have the structurally same hydrophobic group unit, because more transparent micromicelles can be formed in the ink. These two or more surfactants are further preferably surfactants each having as a water-soluble group ethylene oxide having hydroxyl groups at the ends because excellent penetrability can be obtained. Of course, an excellent coloring material image can be formed by incorporating a coloring material in the ink. The most preferable invention is an aqueous ink characterized by comprising a first surfactant having an HLB equal to or greater than 6 and less than 10 and a second surfactant having an HLB of 10 to 15, of which at least the units composed of hydrophobic groups have the same structure, and a compound having a hydrophobic group different from the above described hydrophobic group unit and less hydrophobic than the above described units and a hydrophilic portion composed of only a hydroxyl group, and comprising micromicelles including the first and second surfactants and the above described compound.

According to the present invention, it is made possible to use a surfactant being insoluble or having a low HLB, which has been difficult to use, by forming the surfactant into micromicelles, the surfactant can be effectively used in an inkjet eject system utilizing a change in environmental temperature or heat energy, and advantages can be obtained such as improvement in fixation which can be obtained independent behavior of the surfactant in image formation or on a sheet of paper.

DETAILED DESCRIPTION OF THE PREFERRED EMBODIMENTS

Figure 1:
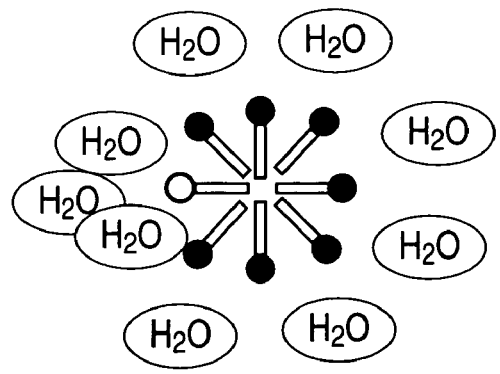
FIG. 1 is a schematic diagram of a state in which a surfactant forms into micelles to be solubilized.

The present invention will now be described more in detail while showing preferred embodiments of the invention. For developing an ink having improved fixation of a recorded matter, excellent in stability and reliability of the ink, and allowing a recorded matter of good quality to be obtained, the inventors of the present invention considered various mechanisms and made studies and evaluations on various coloring materials and ink compositions. As a result, it was found that by combining a compound having an alkyl group and having only a hydroxyl group as a water-soluble group with two or more surfactants which exhibit an opaque or translucent dispersed state in water under certain conditions, as constituent components of an ink which have not been considered previously, micromicelles, which are dispersed into a transparent single phase as if the hydrophobic components were dissolved in water and the dispersibility of which is hardly affected by heat, are formed. Furthermore, the inventors found a new fact that use of the micromicelles in an aqueous ink improves quality of a recorded matter, stabilizes an ink, and improves fixation of the obtained recorded matter, thus leading to the present invention.

That is, it was found that by using an aqueous ink including micromicelles dispersible in water, characterized in that the micromicelles are comprised of two or more surfactants which exhibit an opaque or translucent dispersed state in water, and a compound having an alkyl group and having only a hydroxyl group as a water-soluble group, fixation of the ink and quality of the obtained recorded matter are improved and stability and reliability of the ink and the recorded matter are excellent when the ink is added to a recording medium, and the ink shows especially desirable results if used in inkjet recording. In addition, it was found that the ink according to the present invention, having the above described construction, is considerably improved compared to use of the conventional ink especially in terms of improvement in fixation of the recorded matter and reliability of the ink.

The "micromicelle" as used in the present invention means a micelle such that by utilizing the characteristic of micelle formation specific to a surfactant, a water-insoluble compound added to an aqueous phase forms and disperses transparent micelles as if it were dissolved in the aqueous phase without floating on a gas-liquid interface and precipitating at the bottom, and micelle formation is hard to be collapsed by heat. The micromicelle is not reactive to a coloring material, and exists substantially by itself in a liquid medium such as an ink.

The micromicelle is different from a microemulsion transparently dispersing a water-insoluble compound with general resin components and a micelle dispersing a water-insoluble compound in a micelle form with a surfactant. Specifically, in the microemulsion and the dispersion in a micelle form, a water-insoluble compound is dispersed as if it were dissolved in water, but thermal stability is poor, and therefore they are not preferable for the inkjet recording method in which recording is performed by acting heat energy on an ink. Furthermore, the amount of water-insoluble compound is proportional to the amount of surfactant to be dispersed in a micelle form, and therefore if a large amount of water-insoluble compound is required, the amount of the surfactant also increases, and the micelle enormously increases in size or is emulsified, and if the surfactant is used in an ink, an increase in viscosity of the ink and a reduction in surface tension easily occur, and if the surfactant is used in inkjet recording, ejection of the ink is often compromised.

In contrast to this, the aqueous ink of the present invention comprising micromicelles dispersible in water, characterized in that the micromicelles are comprised of two or more surfactants which exhibit an opaque or translucent dispersed state in water when used in conjunction, and a compound having an alkyl group and having only a hydroxyl group as a water-soluble group, has improved fixation and penetrability on a sheet of paper and has good thermal stability. Because neither an enormous increase in size of micelles nor formation of an emulsified state occurs, use of an ink using micromicelles in inkjet recording does not cause any problems for ejection and the like. The present invention will be described below. First, if it is considered important to obtain high solubility for a surfactant in terms of stability and reliability of an ink, a highly hydrophilic compound is used as a penetrant for the purpose of generally improving fixation of a recorded matter, remarkable fixation cannot be obtained. If fixation is considered most important, a highly hydrophobic compound is used, whereby remarkable fixation can be obtained, but the highly hydrophobic compound is precipitated or separated in the ink, and thus reliability and stability of the ink are impaired.

In view of the situation, the inventors continuously made reviews and detailed studies on recording mediums and various compounds and inks existing in the world. As a result, it was found that, for example, the surface of plain paper such as copy paper is made hydrophobic for improvement in image quality of a recorded matter, and is configured to control penetration of an aqueous liquid when an aqueous ink is used. From the above findings, the inventors concluded that for achieving good ink fixation, a hydrophobic part of the surface of a recording medium should be made hydrophilic by incorporating a highly hydrophobic compound in an aqueous ink.

Generally, however, if a highly hydrophobic compound is added to an aqueous ink, the compound becomes unstable in the ink and is separated as a degree of its hydrophobicity increases. There is also available a method in which a highly hydrophobic compound is used in conjunction with a highly hydrophilic compound to form micelles which may be solubilized. However, water molecules surrounding such micelles have weakened the strength of bonding with the micelles due to an increase in temperature or the like, and therefore the micelles enormously increase in size for maintaining stability or are separated from the highly hydrophobic compound for stability, resulting in impairment of reliability of the ink and reduction in penetrability.

In regard to micelles formed by using a highly hydrophobic compound in conjunction with a highly hydrophilic compound, the inventors made studies and reviews again on a state of the micelles in an aqueous solution, and functional groups contributing to dissolution or dispersion of the micelles in water, and as a result, the inventors found the following:

(1) the micelle is compounds gathering with a hydrophobic part as a base point, in which a hydrophilic portion is hydrogen-bonded with water molecules to dissolve or disperse the compounds in water;

(2) typically, the micelle is formed more easily when the hydrophobic part and the hydrophilic portion have similar structures;

(3) when the hydration capability of the hydrophilic portion is reduced due to an increase in temperature or the like, dissolution or dispersion of the micelle collapses in a moment, or the micelle enormously increases in size for stability; and (4) ethylene oxide is usually used as a hydration group.

The contents of items listed above were examined again from a multilateral viewpoint and as a result, the composition of the ink of the present invention was achieved.

Figure 2:
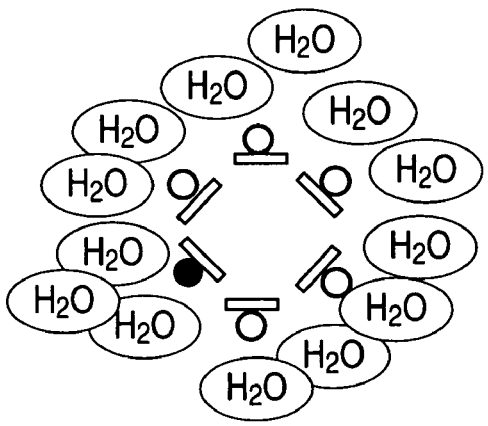
FIG. 2 is a schematic diagram of a state in which a surfactant forms into micelles to be solubilized.
Figure 3:
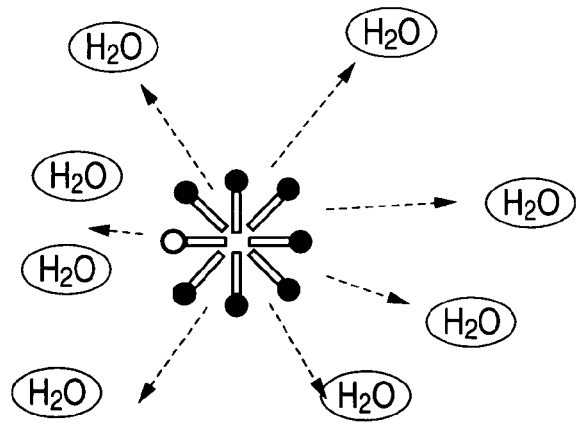
FIG. 3 is a schematic diagram showing a state in which a surfactant forms into micelles to be solubilized, and the temperature increases so that a bond between water molecules and micelles is weakened.
Figure 4:
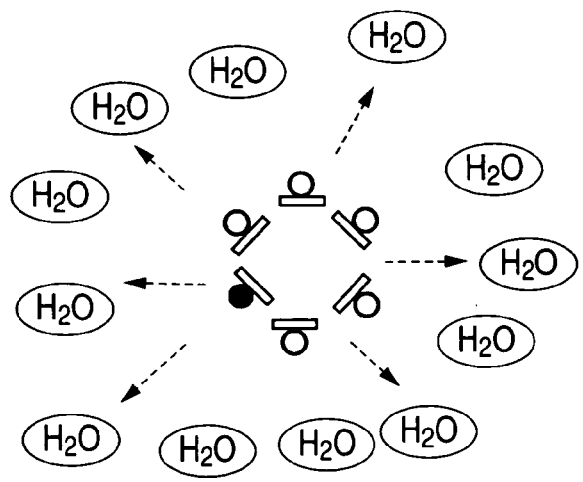
FIG. 4 is a schematic diagram showing a state in which a surfactant forms into micelles to be solubilized, and the temperature increases so that a bond between water molecules and micelles is weakened.
Figure 5:
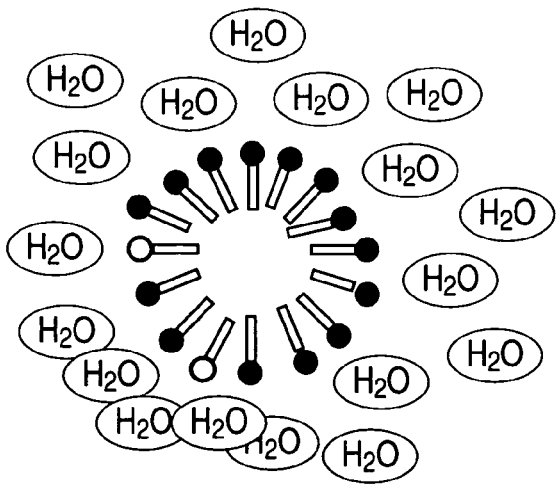
FIG. 5 is a schematic diagram showing a state in which micelles from a surfactant enormously increase in size.
Figure 6:
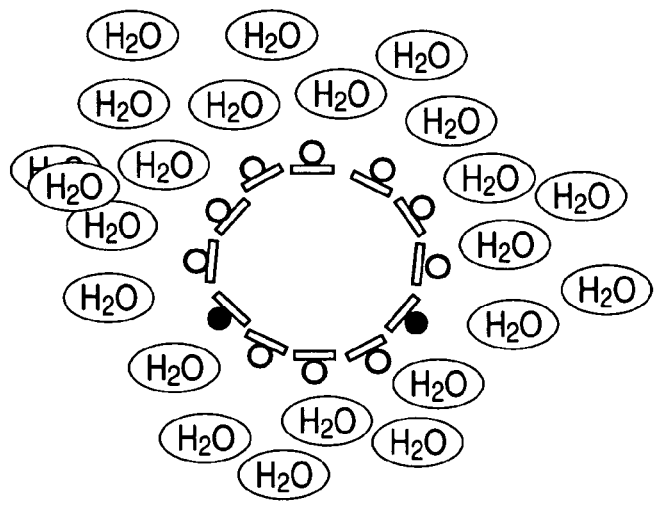
FIG. 6 is a schematic diagram showing a state in which micelles from a surfactant are separated.
Figure 7:
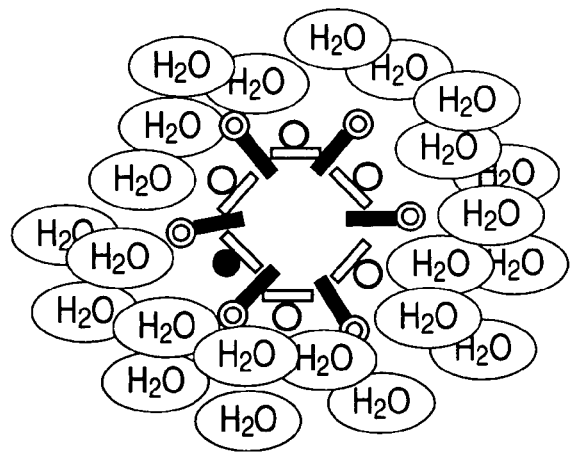
FIG. 7 is a schematic diagram showing the present invention.

The inventors presume that for the aqueous ink according to the present invention, stability and reliability of the aqueous ink and fixation of the obtained recorded matter are improved owing to the specific mechanisms described below. Generally, it is presumed that in the case of a method in which a highly hydrophobic compound is used in conjunction with a highly hydrophilic compound to be formed into micelles, whereby the highly hydrophobic compound is made soluble, the process proceeds as shown in FIGS. 1 and 2. However, as the temperature of this system increases, for example, the bond between water molecules surrounding micelles and the micelles is weakened so that the micelles become hard to be maintained as shown in FIGS. 3 and 4, and as shown in FIGS. 5 and 6, the micelles enormously increase in size for attracting a larger number of water molecules (see FIG. 6), or separate therefrom the highly hydrophobic compound to maintain stability (see FIG. 5). In contrast to this, it is presumed that according to the composition of the ink of the present invention, the resulting micelles have a configuration in which a low-hydrophobic compound having only a hydroxyl group as a hydrophilic group is captured as if pellets were hammered into a ball, and thus the density of the hydrophilic groups possessed by the micelle increases, resulting in formation of micromicelles stable and resistant to a change in temperature, as shown in FIG. 7.

Figure 8:
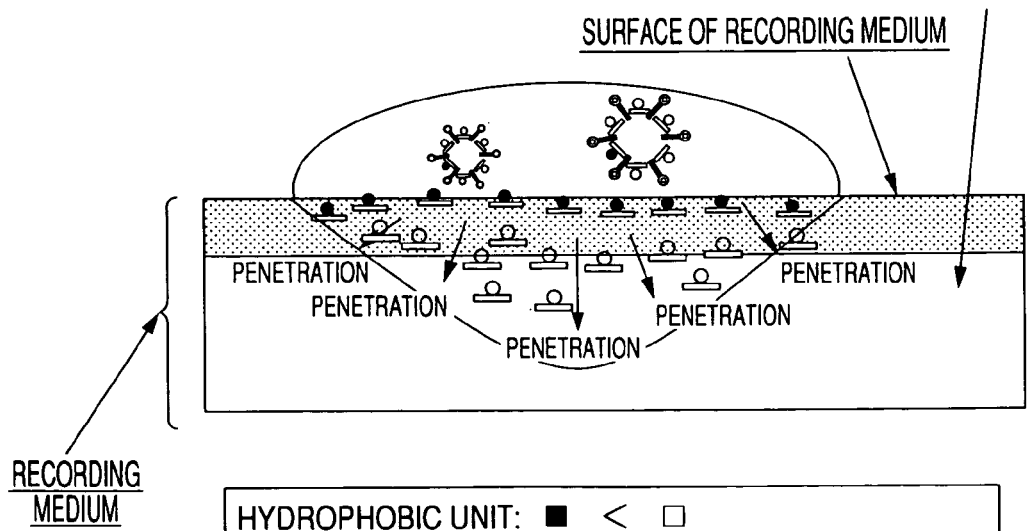
FIG. 8 is a schematic diagram of a mechanism in which a highly hydrophobic compound is preferentially deposited on a hydrophobic part of the surface of a recording medium, and thus the recording medium is made hydrophilic in a direction of ink penetration.

For good fixation, it is presumed that when an ink is deposited on copy paper or the like having the surface made hydrophobic for improving print quality, for example, a combination of two or more surfactants which exhibit an opaque or translucent dispersed state in water is actively deposited on a hydrophobic part of copy paper, whereby the copy paper is made hydrophilic in a direction of ink penetration to obtain good fixation as shown in FIG. 8. A surfactant in a micromicelle form transparently dissolved in an ink droplet, shown in the Figure, has a strong affinity for water, and therefore the surfactant is hard to be deposited on the hydrophobic part of the copy paper, and can contribute to fixation of a coloring material existing in a next ink droplet.

Figure 9:
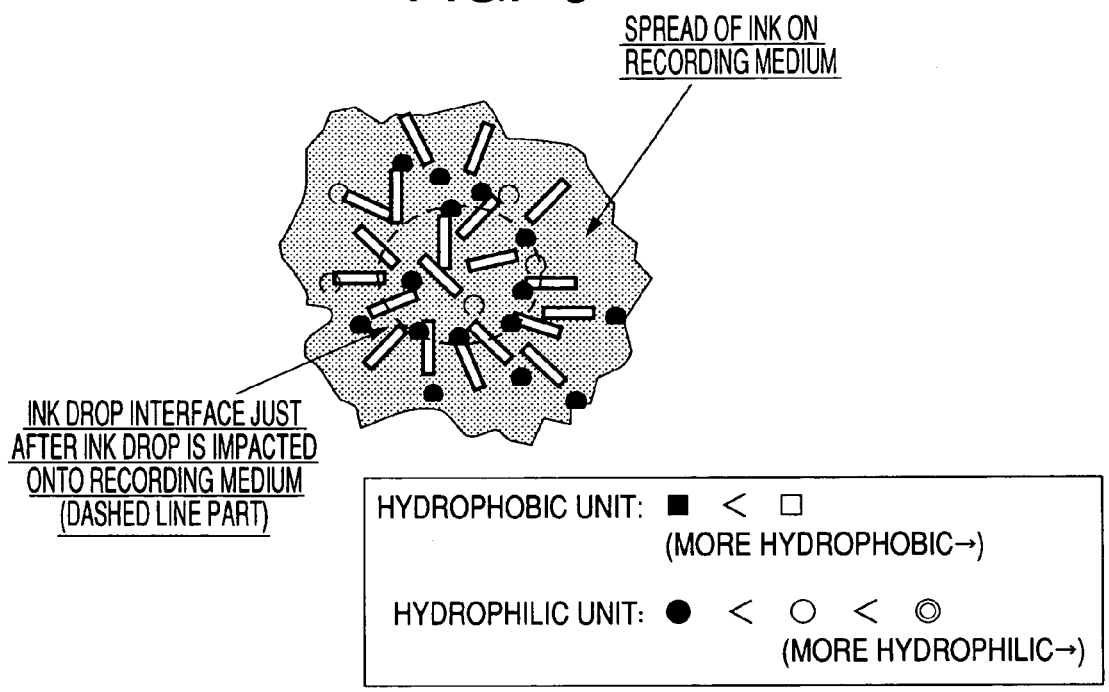
FIG. 9 is a schematic diagram of a situation in which after an ink is shot onto a recording medium, a hydrophobic unit part is hard to form a uniform surface, and the ink spreads irregularly in the conventional ink.
Figure 10:
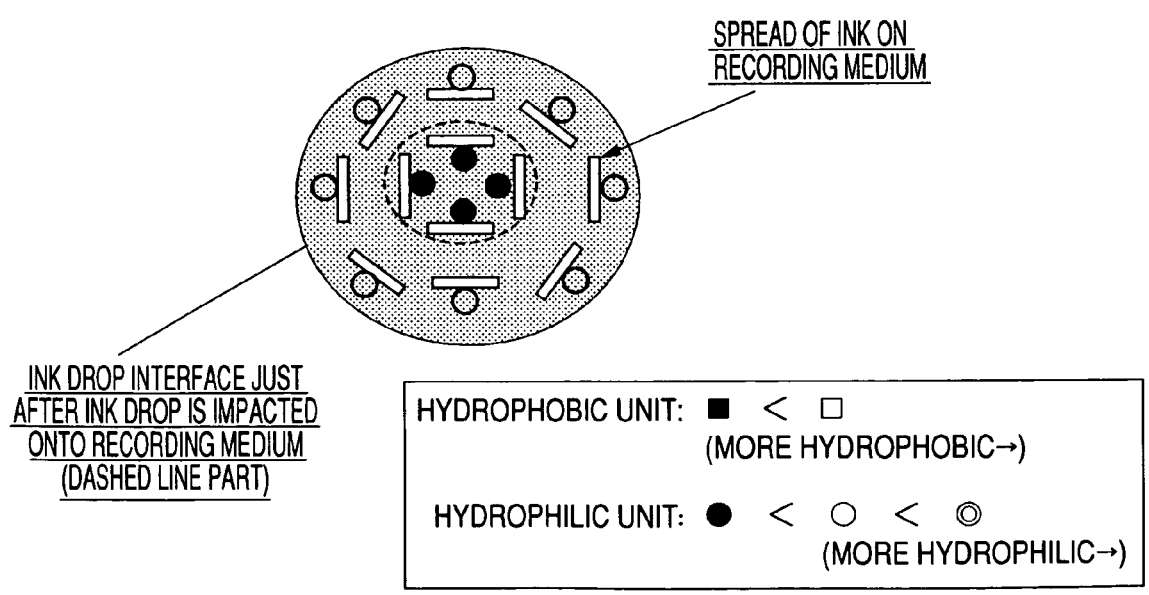
FIG. 10 is a schematic diagram of a situation in which after an ink is shot onto a recording medium, a hydrophobic unit part forms a uniform surface, and the ink spreads uniformly in the ink of the present invention.

For high quality of recorded images, it can be considered that a surfactant or a combination of surfactants transparently dissolved in water causes the ink to spread irregularly on the surface of paper as shown in FIG. 9 due to variations in deposition of the surfactant on the hydrophobic part, whereas for the ink of the present invention, as shown in FIG. 10, when the ink is added to the surface of a recording medium, a combination of two or more surfactants which exhibit an opaque or translucent dispersed state in water in the ink when used in conjunction is actively deposited on the hydrophobic part of the recording medium surface and the internal hydrophobic part, and therefore not only does the ink almost uniformly spread without causing variations, but also penetration of the ink into the internal part of the recording medium having pores is promoted, whereby penetration of the ink is improved to improve quality of the recorded matter formed on the surface of the recording medium.

If two or more surfactants constituting the ink of the present invention, which exhibit an opaque or translucent dispersed state in water, are a combination of a first surfactant insoluble in water and a second surfactant having an HLB of 10 or greater, of which the hydrophobic groups have the same structure, the effect of the present invention is satisfactorily exhibited because the surfactants are not influenced by other components in the ink, or do not influence other components in the ink. In such a combination, two or more surfactants which exhibit an opaque or translucent dispersed state in water are more preferably composed of nonionic surfactants because the surfactants are not influenced by other components in the ink, or do not influence other components in the ink.

It is preferable that a clear ink state obtained by removing coloring materials from the ink of the present invention including a combination of two or more surfactants which exhibit an opaque or translucent dispersed state in water, and a compound having an alkyl group and having only a hydroxyl group as a water-soluble group is not an opaque or translucent dispersed state but a transparent state. This state implies that an aggregate formed by the combination of two or more surfactants which exhibit an opaque or translucent dispersed state in water, and a compound having an alkyl group and having only a hydroxyl group as a water-soluble group is in a micromicellar state, and such a state is a micellar state very stable and robust against external factors such as temperature, and therefore the ink of the present invention not only has improved reliability and but also satisfactorily exhibits the various effects described previously.

In the combination of two or more surfactants which exhibit an opaque or translucent dispersed state in water and a compound having an alkyl group and having only a hydroxyl group as a water-soluble group, a mixed aqueous solution adjusted to have their contents suitable for use in an ink is preferably transparent because separation or precipitation of such components is hard to occur in the ink and also it is easy to obtain the stability of the ink.

According to further studies by the inventors, it was found that when the combination of two or more surfactants which exhibit an opaque or translucent dispersed state in water is a combination of a first surfactant insoluble in water and a second surfactant having an HLB of 10 or greater, of which the hydrophobic groups have the same structure, the effect of the present invention is more satisfactorily exhibited if the boundary condition of the combination of surfactants is whether the value of the HLB is 10 or not. A combination of a compound having an HLB of 10 to 13 and a compound having an HLB equal to or greater than 6 and less than 10 is especially effective. Furthermore, use of a compound having an HLB of 10 or greater and a cloudy point of 50° C. or higher results in a more desirable effect.

In the combination of the first surfactant insoluble in water and the second surfactant having an HLB of 10 or greater, of which the hydrophobic groups have the same structure, micromicelles can be suitably formed if the structure of the surfactant has an unsaturated group, and especially preferable is use of a surfactant having an acetylene bonding group.

Use of a surfactant such that the hydrophilic unit of the combined surfactant is composed of a ring-opened ethylene oxide or a combination of a ring-opened ethylene oxide and a ring-opened propylene oxide is preferable in terms of easy stabilization of an ink. Especially preferable is a surfactant having as a water-soluble group ethylene oxide having a hydroxyl group at the terminal.

Moreover, the surfactant is preferably a compound satisfying the following general formula (I).

(In the general formula (I), A and B are each independently selected from the group consisting of a hydrogen atom, and groups expressed by the following general formulae ($II_A$) and ($II_B$), $X_A$ represents $C_nH_{2n+1}$ (n is an integer number of 1 to 10), and $X_B$ represents $C_mH_{2m+1}$ (m is an integer number of 1 to 10). $Y_A$ and $Y_B$ represent a ring-opened ethylene oxide unit and/or a ring-opened propylene oxide unit, and a and b are each independently an integer number.)

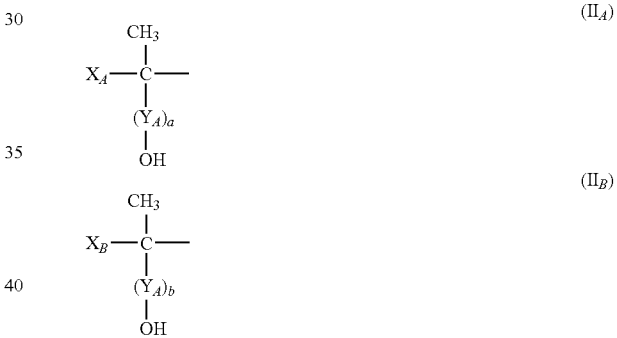

Use of a compound having a structure in which A and B in the general formula (I) are identical is one of preferred forms. Also preferable is use of a compound in which n is an integer number of 5 to 7 in $C_nH_{2n+1}$ in the general formula (I).

Then, if the compound having an alkyl group and having only a hydroxyl group as a water-soluble group has a structure expressed by the following general formula (III), the effect of the present invention is easily exhibited.

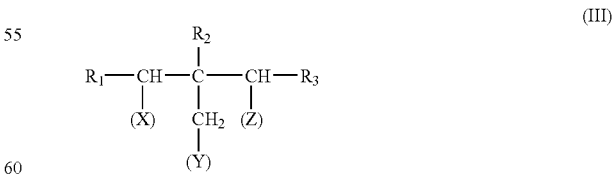

(In the general formula (III), $R_1$, $R_2$ and $R_3$ each independently represent a hydrogen atom or an alkyl group having 1 to 16 carbon atoms. (X), (Y) and (Z) each independently represent OH or D-OH, and D represents a ring-opened ethylene oxide and/or a ring-opened propylene oxide.)

Furthermore, it is preferable that the compound having a structure expressed by the general formula (III) is water-soluble. It is preferable particularly in terms of reliability that in the general formula (III), (X), (Y) and (Z) are OH groups. Furthermore, it is preferable that in the general formula (III), $R_1$, and $R_3$ are hydrogen atoms particularly in formation of a stable aggregate. In the combination of a combination of the first surfactant insoluble in water and the second surfactant having an HLB of 10 or greater, in which both surfactants have the same hydrophobic group structurally, and the compound having an alkyl group and having only a hydroxyl group as a water-soluble group, the effect of the present invention is more satisfactorily exhibited if the first surfactant insoluble in water and the second surfactant having an HLB of 10 or greater, of which the hydrophobic groups have the same structure, have a hydrophobic unit different from that of the compound having an alkyl group and having only a hydroxyl group as a water-soluble group. Owing to the fact that the hydrophobic units are different and the compound has only a hydroxyl group as a hydrophilic portion, stability is improved. This is presumably because the density of hydrophilicity of the aggregate increases. Improvement of dispersion stability of micromicelles is ascribable to the fact that the compound has only a hydroxyl group as a hydrophilic portion.

The aqueous ink of the present invention further contains a coloring material in a dissolved or dispersed state. The dissolved or dispersed coloring material described above refers to, for example, a compound or coloring material itself dissolved or dispersed in water (e.g., dye, or pigment having a hydrophilic group), and a capsulated material including or containing a coloring material. However, a method in which a coloring material is dispersed using a resin or the like as a dispersant like pigment dispersion is not suitable. This is because for this type of method, not only the effect of the above described mechanism is hard to be exhibited due to creation of a state in which a resin is dispersed in an ink, but it can be hardly said that this method is a preferable option with respect to reliability of the ink. Hereinbelow, every state of the coloring material in the liquid medium as described above will be referred to as "dissolution" unless otherwise specified.

The coloring material to be incorporated in the ink of the present invention is preferably a disperse coloring material with a water-soluble group bonded by a chemical reaction in terms of stability of the ink. A coloring material without a water-soluble group chemically bound thereto, e.g., a coloring material having physically adsorbed a polymer dispersant having such a water-soluble group, is much likely to lose the group by the action of the surfactant(s) present therewith. A water-soluble coloring material may be used in the aqueous ink of the present invention, but may be less effective than the water-disperse coloring material in some circumstances. In this case, a coloring material directly dyeing a recording medium (direct dye, etc.) or a coloring material having an azo group in the structure may be used. A coloring material having a structure having a carboxyl group or a group of a salt thereof as a hydrophilic group is preferably used. Moreover, a coloring material having only a carboxyl group or a group of a salt thereof as a hydrophilic group of the coloring material is preferably used. Particularly, the carboxyl group has a low affinity for water compared with the sulfone group, and therefore the effective of the aqueous ink of the present invention can be satisfactorily exhibited by using a coloring material having a carboxyl group.

Specifically, coloring materials include, but are not limited to, for example, dis- or tris-azo coloring materials of high substantivity such as direct black 168 and direct black 154, coloring materials having a dimeric structure such as direct yellow 142, direct yellow 86, direct red 227 and direct red 80, metal-containing coloring materials such as direct blue 199, and coloring materials expressed by the general formulae (A) to (C) in a free acid form as shown below.

Coloring material expressed by the following general formula (A) in a free acid form:

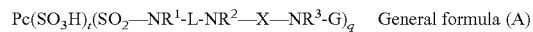

[In the general formula (A), Pc represents a metal-containing phthalocyanine nuclear, and $R^1$, $R^2$ and $R^3$ each independently represent H, an alkyl group, substituted alkyl group, alkenyl group, substituted alkenyl group, aralkyl group or substituted aralkyl group. L represents a bivalent organic linking group. X independently represents a carbonyl group or a group expressed by the following formulae (2) to (4).

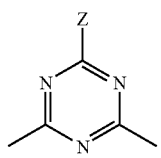

(2)

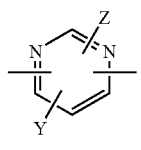

(3)

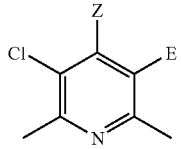

(4)

(Z in the formulae (2) to (4) independently represents $NR^4R^5$, $SR^6$ or $OR^6$, Y in the formula (3) represents H, Cl, the above Z, $SR^7$ or $OR^7$, and E in the formula (4) represents Cl or CN. $R^4$, $R^5$, $R^6$ and $R^7$ each independently represent H, an alkyl group, substituted alkyl group, aryl group, substituted aryl group, aralkyl group or substituted aralkyl group, and $R^4$ and $R^5$ form a five- or six-membered ring with a nitrogen atom.) G represents a colorless organic residue substituted by one or two COSH or COOH groups, and t+q is 3 or 4.]

Coloring material expressed by the following general formula (B) in a free acid form:

[In the general formula (B), J represents the following formula.]

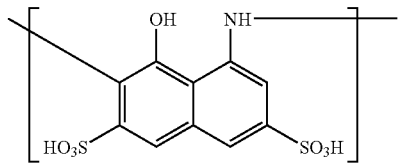

In the general formula (A), $Ar^1$ and $Ar^2$ are each independently an aryl group or substituted aryl group, and at least one of Ar$^1$ and Ar$^2$ each independently have one or more substitutes selected from the group consisting of COOH and COSH. R$^1$ and R$^2$ each independently represent H, an alkyl group, substituted alkyl group, alkenyl group or substituted alkenyl group, L represents a bivalent organic linking group, and n represents 0 or 1. X independently represents a carbonyl group or a group expressed by the following formula (2), (3) or (4).

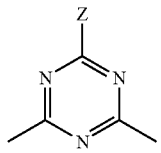

(2)

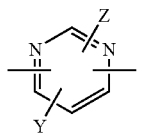

(3)

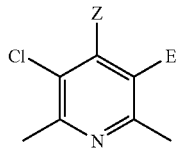

(4)

(Z in the formulae (2) to (4) independently represents NR$^3$R$^4$, SR$^5$ or OR$^5$, Y in the formula (3) independently represents H, Cl, the above Z, SR$^6$ or OR$^6$, and E in the formula (4) independently represents Cl or CN. R$^3$, R$^4$, R$^5$ and R$^6$ each independently represent H, an alkyl group, substituted alkyl group, alkenyl group, substituted alkenyl group, aryl group, substituted aryl group, aralkyl group or substituted aralkyl group, and R$^3$ and R$^4$ form a five- or six-membered ring with a nitrogen atom.) The compound expressed by the general formula (B) has groups selected from the group consisting of COOH and COSH in a number at least equal to the number of SO$_3$H groups.]

Coloring material expressed by the following general formula (C) in a free acid form:

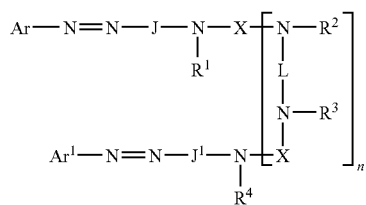

(C)

[In the general formula (C), Ar and Ar$^1$ each independently represent an aryl group or substituted aryl group, at least one of Ar and Ar$^1$ have a substituent selected from the group consisting of a sulfo group, a carboxyl group and a thiocarboxyl group. J and J$^1$ are each independently expressed by the following general formula (2), (3) or (4).

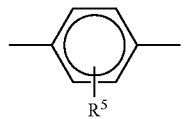

(2)

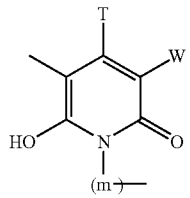

(3)

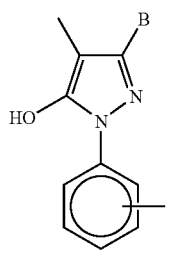

(4)

(In the formula (2), R$^5$ is independently selected from the group consisting of a hydrogen atom, an alkyl group, a substituted alkyl group, an alkoxy group, a halogen group, CN, an ureido group and NHCOR$^6$. The R$^6$ is selected from the group consisting of a hydrogen atom, an alkyl group, a substituted alkyl group, an aryl group, a substituted aryl group, an aralkyl group and a substituted aralkyl group. In the formula (3), T represents an alkyl group, and W is selected from the group consisting of a hydrogen atom, CN, CONR$^{10}$R$^{11}$, a pyridium group and a carboxyl group. R$^{10}$ and R$^{11}$ are each independently selected from the group consisting of a hydrogen atom, an alkyl group and a substituted alkyl group. m represents an alkylene chain having 2 to 8 carbon atoms and in the formula (4), B is selected from the group consisting of a hydrogen atom, an alkyl group and a carboxyl group.

R$^1$, R$^2$, R$^3$ and R$^4$ in the formula (C) are each independently selected from the group consisting of a hydrogen atom, an alkyl group and a substituted alkyl group, L represents a bivalent organic linking group, n represents 0 or 1, and X is independently a carbonyl group or a group expressed by the following general formula (5), (6) or (7).

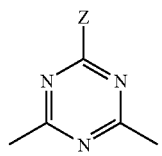

(5)

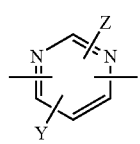

(6)

-continued

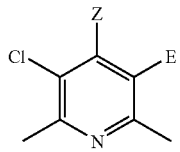

(7)

(In the formulae (5) to (7), Z is selected from the group consisting of $OR^7$, $SR^7$ and $NR^8R^9$, Y is selected from the group consisting of a hydrogen atom, Cl, CN and Z, and E is selected from the group consisting of Cl and CN. $R^7$, $R^8$ and $R^9$ each independently represent a hydrogen atom, alkenyl group, substituted alkenyl group, alkyl group, substituted alkyl group, aryl group, substituted aryl group, aralkyl group or substituted aralkyl group, and $R^8$ or $R^9$ may form a five- or six-membered ring with the nitrogen atom to which these are attached.)

If the compound expressed by the general formula (C) has no sulfone group, it has at least two groups selected from the group consisting of a carboxyl group and a thiocarboxyl group, and the compound expressed by the general formula (C) has a sulfo group and a group selected from the group consisting of a carboxyl group and a thiocarboxyl group in a number at least equal to the number of the sulfo group.]

The amount of the above coloring material to be used is not specifically limited, but generally preferably is in the range of 0.1 to 15% by weight, and more preferably 0.1 to 10% by weight based on the total weight of ink.

For the aqueous ink of the present invention, further a monohydric alcohol is preferably used in the ink in terms of stability of the ink. The monohydric alcohol has an effect of mixing water and oil as in drainage of water in gasoline, for example. This indicates that use of a monohydric alcohol in the ink is preferable in terms of stability of the ink in realization of the mechanism described previously. The monohydric alcohol has a desirable effect for vaporization and penetration into the recording medium when the ink is added onto the recording medium, and therefore the monohydric alcohol is effective for exhibiting the effect of the present invention more satisfactorily. The content of monohydric alcohol in the ink of the present invention is 0.1 to 20% by weight, and preferably is 0.5 to 10% by weight based on the total weight of ink. Specific examples of monohydric alcohols capable of being used as an ink component of the present invention include ethanol, isopropyl alcohol and n-butanol.

Moreover, a water holding agent may be used in the aqueous ink of the present invention. For the water holding agent, a compound selected from the group consisting of urea and urea derivatives is preferably used. Incorporation of urea and urea derivatives in the ink results in an improvement in stability of the ink. Further, the compound selected from the group consisting of urea and urea derivatives is effective as an auxiliary solvent and therefore preferable for stability of the ink.

If the recording medium is bond paper, for example, the effect of improving fixation of the present invention is more easily exhibited owing to moisture holding ability of the bond paper. That is, it is presumed that owing to retention of water in the recording medium, time for conformity at the interface between the ink and recording medium is shortened to improve fixation.

The urea derivative is preferably a compound other than cyclic compounds, for example at least one type selected from alkyl derivatives of urea and ethylene oxide and/or propylene oxide adducts of urea, or it is preferably selected as appropriate from compounds derived by means of at least two of the above derivative groups. However, the selection depends on the amount and nature of each component constituting the ink. A water-soluble compound is preferably used. The used amount of the above water holding agent is not specifically limited but generally, its content is preferably in the range of 0.1 to 15% by weight, further preferably 0.1 to 10% by weight based on the total weight of ink.

The aqueous ink of the present invention may optionally contain various kinds of additives such as a water-soluble organic solvent, a surfactant, a rust inhibitor, a preservative, an antimold agent, an antioxidant, an antireductant, a vaporization promoter, a chelating agent, a water-soluble polymer and a pH regulator.

For the liquid medium for use in the aqueous ink of the present invention, water is preferably used as described previously, but a mixture obtained by adding a water-soluble organic solvent to water is also preferably used. Specific examples of water-soluble organic solvents which can be used include amides such as dimethyl formamide and dimethyl acetamide; ketones such as acetone; ethers such as tetrahydrofuran and dioxane; polyalkylene glycols such as polyethylene glycol and polypropylene glycol; alkylene glycols with an alkylene group containing 2 to 6 carbon atoms such as ethylene glycol, propylene glycol, butylenes glycol, triethylene glycol, 1,2,6-hexanetriol, thiodiglycol, hexylene glycol and diethylene glycol; glycerin; lower alkyl ethers of polyhydric alcohols such as ethylene glycol monomethyl (or ethyl) ether, diethylene glycol monomethyl (or ethyl) ether and triethylene glycol monomethyl (or ethyl) ether; cyclic amide compounds such as N-methyl-2-pyrrolidone, 1,3-dimethyl-2-imidazolidinone, triethanol amine, sulfolane, dimethyl sulfoxide, 2-pyrrolidone and ε-caprolactam; and imide compounds such as succinimide.

The water-soluble organic solvent that is used preferably has a solubility parameter value greater than that of the compound having an alkyl group and having only a hydroxyl group as a water-soluble group. This improves stability including stability of a gas-liquid interface in an ink state. As such a compound, a glycol compound which is a liquid at ordinary temperatures is especially preferably used among the compounds described above. The used amount of the water-soluble organic solvent which is incorporated in the ink of the present invention is not specifically limited, but is generally preferably in the range of 0.1 to 15% by weight, more preferably 0.1 to 10% by weight based on the total weight of ink.

The content of the water-soluble organic solvent described above is generally preferably 1 to 40% by weight, and more preferably 3 to 30% by weight based on the total weight of ink. The content of water in the ink is in the range of 30 to 95% by weight. If the content of water is less than 30% by weight, the dissolution or the like of the coloring material is lowered, and the viscosity of the ink increases, which is not preferable. If the content of water is greater than 95% by weight, the amount of vaporized components is too large to achieve adequate fixation characteristics.

The aqueous ink of the present invention preferably has a surface tension of 40 dyn/cm (mN/m) or less. For realization of the mechanism described previously, an aqueous ink with a droplet spreading after recording is more preferable for exhibiting the effect of the present invention, for example. The pH of the ink of the present invention is preferably 8 or greater in terms of stability of the ink.

The aqueous ink of the present invention preferably has a plurality of counter ion components used in conjunction as counter ions for ionic hydrophilic groups of the coloring materials listed previously. For example, it preferably has a plurality of alkali metal ions used in conjunction, or an alkali metal ion used in conjunction with an ammonium ion. When the ink of the present invention is used in inkjet recording, the ink may be more stable and ejected more easily if both of the ions are used together. Alkali metal ions may include $Li^+$, $Na^+$ and $K^+$.

The aqueous ink of the present invention configured as described above may be used as a normal ink for stationery, but is especially effective when used in inkjet recording. Unlike recording onto a recording medium with a writing pressure as is done by stationery, inkjet recording is a system in which ink droplets are shot onto the surface of a recording medium such as paper to perform recording with penetration and spread of the ink droplets themselves, and thus the interface state of the ink droplet significantly influences recording quality. Inkjet recording methods include a recording method in which mechanical energy is applied to an ink to eject liquid droplets, and an inkjet recording method in which heat energy is applied to an ink to cause foaming of the ink to eject liquid droplets, but the ink of the present invention is particularly suitable for the type of inkjet recording method in which an ink is foamed by heat energy to eject the ink, wherein the ink is very stably ejected and occurrence of satellite dots is prevented. In this case, however, thermal property values (e.g., specific heat, heat expansion coefficient, heat conductivity, etc.) of the ink may be adjusted.

For improvement of matching with a head for inkjet, it is desirable that the aqueous ink of the present invention should be adjusted so that as properties of the ink itself, the surface tension at 25° C. is 30 to 40 dyn/cm (mN/m), and the viscosity is 15 cP (mPa·s) or less, preferably 10 cP (mPa·s) or less, more preferably 5 cP (mPa·s) or less. Thus, for adjusting the ink to have the properties described above and enabling recording on plain paper, the content of water contained in the ink of the present invention should be 50 to 98% by weight, preferably 60 to 95% by weight.

The aqueous ink of the present invention is used in a head of the inkjet eject system, and is effective either as an ink housing (recording unit, ink cartridge, etc.) in which the ink is contained, or an ink to be filled in the housing. Particularly, the present invention provides an excellent effect in a recording head and a recording apparatus of the bubble jet (registered tradename) system among inkjet recording systems.

For the typical configuration and principle of the system, a basic principle disclosed in, for example, U.S. Pat. No. 4,723,129 specification or U.S. Pat. No. 4,740,796 specification is preferably used. This system is applicable for both the so called on-demand type and continuous type, but is particularly effective for the on-demand type because in the case of the on-demand type, at least one drive signal corresponding to record information and giving a rapid increase in temperature exceeding nuclear boiling is applied to an electrothermal converter placed in relation to a sheet and a liquid flow channel holding the ink, whereby heat energy is produced in the electrothermal converter, the heat action surface of the recording head undergoes film boiling and as a result, air bubbles can be formed in the ink in response to the drive signal on a one-to-one basis. The ink is ejected through an opening for eject by growth and shrinkage of the air bubbles to form at least one drop. It is more preferable that the drive signal has a pulse shape because the growth and shrinkage of air bubbles occurs immediately and appropriately, thus making it possible to achieve eject of the ink excellent in responsiveness. For the drive signal having a pulse shape, drive signals described in U.S. Pat. No. 4,463,359 specification and U.S. Pat. No. 4,345,262 specification are suitable. If conditions described in the specification of U.S. Pat. No. 4,313,124 of an invention of about the rate of increase in temperature of the heat action surface are employed, more excellent recording can be performed.

For the configuration of the recording head, the present invention is effective not only for the configuration of combination of an eject port, a liquid channel and an electrothermal converter (straight liquid flow channel or perpendicular liquid flow channel) disclosed in each of the specifications described above, but also for the configuration described in U.S. Pat. No. 4,558,333 specification and U.S. Pat. No. 4,459,600 specification disclosing a configuration in which a thermally active part is placed in a curved area, or the atmosphere communicating eject system described in Japanese Patent No. 2962880, Japanese Patent No. 3246949 and Japanese Patent Application Laid-Open No. H11-188870. In addition, the present invention is effective for a configuration in which an eject port common for a plurality of electrothermal converters is an eject part of the electrothermal converter (Japanese Patent Application Laid-Open No. S59-123670). A full line type recording head having a length matching the width of a maximum recording medium onto which the recording apparatus can print may have either a configuration in which the length is met by a combination of a plurality of recording heads as disclosed in the specifications described above, or a configuration as one integrally formed recording head, and the present invention can further effectively exhibit the effect described above.

In addition, the present invention is effective when using a replaceable chip type recording head which is attached to an apparatus main body to enable electric connection to the apparatus main body and supply of an ink from the apparatus main body, or when using a cartridge type recording head integrally provided in the recording head itself. Addition of recovery means for the recording head, auxiliary assistance means and the like which are provided as components of the applied recording apparatus is preferable because the effect of the present invention can be exhibited more stably. Specifically, they are capping means for the recording head, cleaning means, pressuring or suctioning means, an electrothermal converter or other heating element or preheating means by a combination thereof, and a preliminary eject mode performing eject for a purpose other than recording.

The forms of the preferred inkjet recording methods of the present invention will described in summary. First, the inkjet recording method of the present invention is preferably an inkjet recording method in which ink droplets are ejected through orifices in response to recording signals to perform recording onto a recording medium to obtain a recorded matter, characterized in that an aqueous system is contained in an ink holder or ink container composed of a compound selected from the group consisting of polyacetate and polyolefin characterized in that the ink is an aqueous ink including micromicelles which are dispersed in water, and the micromicelles are comprised of two or more surfactants, which exhibit an opaque or translucent dispersed state in water, and a compound having an alkyl group and having only a hydroxyl group as a water-soluble group. The ink holder or ink container is especially preferably composed of polypropylene.

The inkjet recording method of the present invention in which aqueous ink droplets are ejected through orifices in response to recording signals to perform recording onto a recording medium to obtain a recorded matter is characterized by using as the ink an ink of the present invention having the preferred forms described above. The inkjet recording method of the present invention is preferably a type of method in which heat energy is applied to the ink to be ejected through orifices, and thereby ink droplets are ejected. For further improvement of the effect of the present invention, the amount of the ink droplet ejected through the orifice is 50 ng or less, preferably 35 ng or less, further preferably 25 ng or less. However, appropriate measurements should be (taken according to situations) because influences by the recording medium, the recording environment and the like are significant.

Another preferred form of the present invention is a recording unit comprising an ink-containing section containing an ink, and a head section for ejecting the ink as ink droplets, characterized in that the ink is at least one of the inks of the present invention having the preferred forms described above. Preferred forms of the recording unit of the present invention include a form having a configuration in which the head section applies heat energy to eject ink droplets, a form in which the ink-containing section is composed of polyolefin, a form in which the ink-containing section has an ink holder therein, and a form in which the ink holder is composed of at least one selected from the group consisting of polyvinyl acetate and polyolefin.

Further, preferred forms of the recording unit of the present invention include a form in which the ink holder is porous, a form in which the ink holder has a multilayer structure, a form in which multiple layers of the multilayer structure are arranged in a direction of eject of the ink in the ink-containing section, a form in which the ink holder is composed of a fiber aggregate, and a form in which the fiber aggregate is arranged in the direction of eject of the ink in the ink-containing section, and the ink holder has a surface in contact with the ink-containing section.

Another preferred form of the present invention is an ink cartridge comprising an ink-containing section containing an ink, characterized in that the ink is at least one of the inks of the present invention having the preferred forms described above. Preferred forms of the ink cartridge include a form in which the ink-containing section is composed of polyolefin, a form in which the ink-containing section has an ink holder therein, a form in which the ink holder is composed of at least one selected from the group consisting of polyvinyl acetate and polyolefin, and a form in which the ink holder is composed of a polymer of inorganic compounds.

Further, preferred forms of the recording cartridge of the present invention include a form in which the ink holder is porous, a form in which the ink holder has a multilayer structure, a form in which multiple layers of the multilayer structure are arranged in a direction of eject of the ink in the ink-containing section, a form in which the ink holder is composed of a fiber aggregate, and a form in which the fiber aggregate is arranged in the direction of eject of the ink in the ink-containing section, and the ink holder has a surface in contact with the ink-containing section.

Another preferred form of the present invention is an inkjet recording apparatus comprising an ink-containing section for containing an ink, and a head section for ejecting the ink as ink droplets, characterized in that the ink is at least one of the inks of the present invention having the preferred forms described above. Preferred forms of the inkjet recording apparatus include a form in which the recording unit is at least one of the recording units of the present invention described above.

Another preferred form of the present invention is an inkjet recording apparatus comprising a recording unit for ejecting ink droplets, an ink cartridge having an ink-containing section containing an ink, and an ink supply section for supplying the ink to a recording head from the ink cartridge, characterized in that the ink is at least one of the inks of the present invention having the preferred forms described above. Preferred forms of the inkjet recording apparatus include a form in which the recording unit is at least one of the recording units of the present invention described above, and a form in which the ink cartridge is at least one of the ink cartridges of the present invention described above.

The present invention will now be described more specifically with Examples and Comparative Examples. Parts and % in the text refer to parts by weight and % by weight unless otherwise specified.

<Preparation of Black Pigment Dispersion A>

10 g of carbon black having a surface area of 230 m$^2$/g and DBP oil absorption of 70 ml/100 g, 3.41 g of p-amino-N-benzoic acid and 72 g of pure water were sufficiently stirred, and then stirred at 70° C. while dropping 1.62 g of nitric acid. After the resultant mixture was sufficiently stirred, a solution obtained by dissolving 1.07 g of sodium nitrite in 5 g of pure water is added to the mixture, and the resultant mixture was additionally stirred for an hour. Then, the obtained slurry was filtered with a filter paper (trade name: Toyo Roshi No. 2 manufactured by Advantis Co., Ltd.), filtered pigment particles were sufficiently washed with water, and then dried in an oven at 90° C., and pure water was added to the pigment to prepare an aqueous pigment solution (Bk pigment dispersion A) having a pigment concentration of 10% by weight. A group expressed by the following chemical formula was introduced into the surface of carbon black by the method described above.

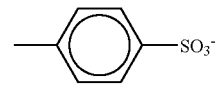

<Preparation of Black Pigment Dispersion B>

1.58 g of anthranilic acid was added to a solution obtained by dissolving 5 g of concentrated hydrochloric acid in 5.3 g of water at 5° C. To the resultant mixture, a solution obtained by adding 1.78 g of sodium nitrite to 8.7 g of water at 5° C. was added while it was kept at 10° C. or lower by stirring with an ice bath. The resultant mixture was further stirred for 15 minutes, 20 g of carbon black having a surface area of 320 m$^2$/g and DBP oil absorption of 120 ml/100 g was then added in a mixed state, and the resultant mixture was further stirred for 15 minutes. The obtained slurry was filtered with a filter paper (trade name: Toyo Roshi No. 2 manufactured by Advantis Co., Ltd.), filtered pigment particles were sufficiently washed with water, and dried in an oven at 110° C., and water was added to the pigment to prepare an aqueous pigment solution having a pigment concentration of 10% by weight. A group expressed by the following chemical formula was introduced into the surface of carbon black by the method described above.

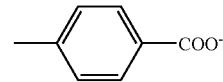

EXAMPLES 1 TO 7, COMPARATIVE EXAMPLES 1 TO 8

Inks of Examples 1 to 7 and Comparative Examples 1 to 8 were prepared in formulations shown in Table 1 described below. Components shown in Tables 1 and 2 were mixed, the resultant mixtures were sufficiently stirred to be dissolved and/or dispersed, and then the resultant solutions and/or dispersions were filtered under pressure with Fluoropore Filter having 0.1 μm in pore size (trade name: manufactured by Sumitomo Electric Industries, Ltd.) to prepare the inks.

For the compound having an alkyl group and having only a hydroxyl group as a water-soluble group in the tables, the following compounds were used. The unit of values in the table is % by weight.

Compounds having basic structures (B):

TABLE 1

Ink Compositions Used in Examples

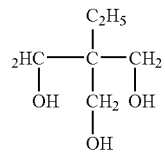
(B1)

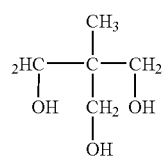
(B2)

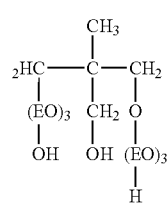
(B3)

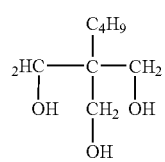
(B4)

| | | | Examples | | | | | | |
|---|---|---|---|---|---|---|---|---|---|
| | | | 1 | 2 | 3 | 4 | 5 | 6 | 7 |
| C.I. Direct Black 154 | | | | | | 2.5 | | | |
| C.I. Direct Black 195 | | | 2 | | | | | | |
| C.I. Direct Blue 199 | | | | | | | 1.5 | | |
| C.I. Direct Red 80 | | | | | | | | 0.2 | |
| Black Pigment dispersion (A) | | | | | | | | 20 | |
| Black pigment dispersion (B) | | | | 20 | | | | | 20 |
| Glycerin | | | 8 | 8 | | | 5 | 8 | 10 |
| Diglycerin | | | | | 5 | | | | |
| Ethylene glycol | | | | | | 9 | 5 | | |
| Diethylene glycol | | | 8 | 8 | | | | 8 | 10 |
| 1,2,6-hexanetriol | | | | | | 9 | | | |
| 2-pyrrolidone | | | | | 5 | | | | |
| Combination of surfactants | | HLB = 5 | | | | | | | |
| expressed by general | | HLB = 7 | | | | 0.4 | | 0.1 | |
| formula (I), which exhibit | | HLB = 9 | 0.5 | 0.3 | | 0.35 | 0.2 | 0.2 | 0.5 |
| an opaque or translucent | | HLB = 11 | | | 0.2 | 0.5 | | | |
| dispersed state in water | | HLB = 13 | 1 | 1 | 0.9 | 0.6 | 1 | 1.1 | |
| when combined | | HLB = 15 | | | | | | | 1.5 |
| Compound having | | (B1) | 8 | 8 | 13 | | 5 | 9.5 | 10 |
| an alkyl group and having | | (B2) | | | | | | 3 | |
| only a hydroxyl group | | (B3) | | | 10 | | | | |
| as a water-soluble group | | (B4) | | | | | | | 3 |
| n-butyl alcohol | | | | | | | | | |
| Pure water | | | Balance | Balance | Balance | Balance | Balance | Balance | Balance |

TABLE 2

Ink Compositions Used in Comparative Examples

| | | Comparative Examples | | | | | | | |
|---|---|---|---|---|---|---|---|---|---|
| | | 1 | 2 | 3 | 4 | 5 | 6 | 7 | 8 |
| C.I. Direct Black 154 | | | | | | | | | |
| C.I. Direct Black 195 | | 2 | 2 | 2 | 2 | 2 | 2 | | |
| C.I. Direct Blue 199 | | | | | | | | | |
| C.I. Direct Red 80 | | | | | | | | | |
| Black pigment dispersion (A) | | | | | | | | 20 | |
| Black pigment dispersion (B) | | | | | | | | | 20 |
| Glycerin | | 5 | 5 | 5 | 5 | 5 | 5 | 5 | 5 |
| Diglycerin | | | | | | | | | |
| Ethylene glycol | | | | | | | | | |
| Diethylene glycol | | 10 | 10 | 10 | 10 | 10 | 10 | 10 | 10 |
| 1,2,6-hexanetriol | | 6 | 6 | 6 | 6 | 6 | 6 | 6 | 6 |
| 2-pyrrolidone | | | | | | | | | |
| Combination of surfactants expressed by general formula (I), which exhibit an opaque or translucent dispersed state in water when combined | HLB = 5 | | | | | 0.3 | | | |
| | HLB = 7 | | | | | | | | |
| | HLB = 9 | | 0.5 | 0.5 | | | 0.5 | | |
| | HLB = 11 | | | 0.2 | | | 1 | | |
| | HLB = 13 | 1 | | 1 | | 1 | | | |
| | HLB = 15 | | | | | | 1 | | |
| Compound having an alkyl group and having only a hydroxyl group as a water-soluble group | (B1) | 8 | 8 | | 8 | | 10 | | |
| | (B2) | | | | | | | | |
| | (B3) | | | | | | | | |
| | (B4) | | | | | | | | |
| n-butyl alcohol | | | | | | | | | 6 |
| Pure water | | Balance | Balance | Balance | Balance | Balance | Balance | Balance | Balance |

<Evaluation>

(Evaluation of Appearance of Clear Ink)

First, clear inks each containing no coloring material were prepared from the ink compositions of Examples 1 to 7 and Comparative Examples 1 to 8 shown in Tables 1 and 2 described above. Then, the obtained clear ink was put into a transparent glass container, the appearance of the clear ink was visually observed under an environment of water temperature of 25° C., and evaluations were made based on the following criteria.

○: The clear ink was neither cloudy nor separated near the gas-liquid interface. Also, no absorption was observed when the ink was measured with a spectrophotometer.

x: The clear ink was cloudy and/or a separation phase was observed near the gas-liquid interface.

(Measurement of Cloudy Point)

The ink contained in the transparent glass container, which was prepared for the evaluation of clear inks described above, was put into a water bath filled with water, the water temperature was gradually elevated from 25° C. to 95° C. while occurrence of a cloudy point was observed, and evaluations were made based on the following criteria.

○: No cloudy point was observed.

Δ: The ink became slightly cloudy during elevation of temperature.

x: The ink became distinctively cloudy during elevation of temperature.

(Evaluation of Fixation 1)

The inks of Examples 1 to 7 and Comparative Examples 1 to 8 having the compositions shown in Tables 1 and 2 were each placed in Inkjet Printer BJF 800 (trade name: manufactured by Canon Inc.), various kinds of patterns were printed on commercially available copy paper under an environment of temperature of 25° C. and humidity of 55%, contamination of a printed area by rubbing the printed area by hand was then visually observed, and evaluations made based on the following criteria.

○: The printed area was no longer contaminated in 0.2 seconds after printing.

Δ: The printed area was no longer contaminated in 0.5 seconds after printing.

x: The printed area was no longer contaminated in 1.0 second after printing.

xx: The printed area was contaminated in 1.0 second after printing.

(Evaluation of Fixation 2)

The inks of Examples 1 to 7 and Comparative Examples 1 to 8 having the compositions shown in Tables 1 and 2 were each placed in Inkjet Printer BJF 800 (trade name: manufactured by Canon Inc.), various kinds of patterns were printed on commercially available copy paper under a high-temperature and high-humidity environment of temperature of 30° C. and humidity of 80%, contamination of a printed area by rubbing the printed area by hand was then visually observed, and evaluations were made based on the following criteria.

○: The printed area was no longer contaminated in 0.2 seconds after printing.

Δ: The printed area was no longer contaminated in 0.5 seconds after printing.

x: The printed area was no longer contaminated in 1.0 second after printing.

xx: The printed area was contaminated in 1.0 second after printing.

(Evaluation of Stability 1)

The inks of Examples 1 to 7 and Comparative Examples 1 to 8 having the compositions shown in Tables 1 and 2 were each put into a transparent glass container, left standing under an environment of 25° C. for a month, and evaluations were made based on the following criteria.

○: None of a precipitate, a suspension and a change in color tone was observed.

Δ: A slight amount of precipitate and/or suspension was observed, but a change in color tone was not observed.

x: A fair amount of precipitate and/or suspension was observed.

(Evaluation of Stability 2)

The inks of Examples 1 to 7 and Comparative Examples 1 to 8 having the compositions shown in Tables 1 and 2 were each put into a transparent glass container, left standing under an environment of 5° C. for a month, and evaluations were made based on the following criteria.

○: None of a precipitate, a suspension and a change in color tone was observed.

Δ: A slight amount of precipitate and/or suspension was observed, but a change in color tone was not observed.

x: A fair amount of precipitate and/or suspension was observed.

(Evaluation of Stability 3)

The inks of Examples 1 to 7 and Comparative Examples 1 to 8 having the compositions shown in Tables 1 and 2 were each put into a transparent glass container, left standing under an environment of 60° C. for a month, and evaluations were made based on the following criteria.

○: None of a precipitate, a suspension and a change in color tone was observed.

Δ: A slight amount of precipitate and/or suspension was observed, but a change in color tone was not observed.

x: A fair amount of precipitate and/or suspension was observed.

(Evaluation of Ejection 1)

The inks of Examples 1 to 7 and Comparative Examples 1 to 8 having the compositions shown in Tables 1 and 2 were each placed in Inkjet Printer BJF 800 (trade name: manufactured by Canon Inc.), alphanumeric letters were continuously printed under a laboratory environment until the ink cartridge was used up, and evaluations were made based on the following criteria.

○: Printed letters were not disturbed, and letters could be finely printed to the last.

Δ: Printed letters were slightly disturbed, but letters could be printed in this state to the last.

x: Printed letters were disturbed, and letters could not be finely printed to the last.

(Evaluation of Ejection 2)

The inks of Examples 1 to 7 and Comparative Examples 1 to 8 having the compositions shown in Tables 1 and 2 were each placed in Inkjet Printer BJF 800 (trade name: manufactured by Canon Inc.), alphanumeric letters were continuously printed under an environment of 30° C. until the ink cartridge was used up, and evaluations were made based on the following criteria.

○: Printed letters were not disturbed, and letters could be finely printed to the last.

Δ: Printed letters were slightly disturbed, but letters could be printed in this state to the last.

x: Printed letters were disturbed, and letters could not be finely printed to the last.

(Evaluation of Ejection 3)

The inks of Examples 1 to 7 and Comparative Examples 1 to 8 having the compositions shown in Tables 1 and 2 were each placed in Inkjet Printer BJF 800 (trade name: manufactured by Canon Inc.), alphanumeric letters were continuously printed under an environment of 15° C., and evaluations were made based on the following criteria.

○: Printed letters were not disturbed, and letters could be finely printed to the last.

Δ: Printed letters were slightly disturbed, but letters could be printed to the last.

x: Printed letters were disturbed, and letters could not be printed to the last.

(Evaluation of Ejection after Standing)

The inks of Examples 1 to 7 and Comparative Examples 1 to 8 having the compositions shown in Tables 1 and 2 were each placed in Inkjet Printer BJF 800 (trade name: manufactured by Canon Inc.), and left standing under a laboratory environment for a month, alphanumeric letters were then printed, and evaluations were made based on the following criteria while comparing the printed letters with letters printed before the ink was left standing.

○: Printed letters were not disturbed, letters could be finely printed, and they were not inferior to letters printed before the ink was left standing.

Δ: Printed letters were slightly disturbed compared with letters printed before the ink was left standing.

x: Printed letters were significantly disturbed compared with letters printed before the ink was left standing.

(Evaluation of Print Quality)

The inks of Examples 1 to 7 and Comparative Examples 1 to 8 having the compositions shown in Tables 1 and 2 were each placed in Inkjet Printer BJF 600 (trade name: manufactured by Canon Inc.), various kinds of patterns were printed under a laboratory environment, and evaluations were made based on the following criteria.

○: The ink was not inferior to the regular ink for Inkjet Printer BJF 800 (trade name: manufactured by Canon Inc.).

Δ: The ink slightly spread compared with the regular ink for Inkjet Printer BJF 800 (trade name: manufactured by Canon Inc.).

x: The ink significantly spread compared with the regular ink for Inkjet Printer BJF 800 (trade name: manufactured by Canon Inc.).

(Evaluation of Water Resistance)

The inks of Examples 1 to 7 and Comparative Examples 1 to 8 having the compositions shown in Tables 1 and 2 were each placed in Inkjet Printer BJF 600 (trade name: manufactured by Canon Inc.), various kinds of patterns were printed under a laboratory environment, and then left standing for an hour, tap water was then dashed on the printed surface, and evaluations were made on contamination of the printed surface based on the following criteria.

○: The printed surface was not contaminated, but kept clear.

Δ: The printed surface was slightly contaminated, but the printed matter could be read without any trouble.

x: The printed surface was badly contaminated, and the printed matter was hard to read.

TABLE 3

Results of Evaluation in Examples

| | Examples | | | | | | |
|---|---|---|---|---|---|---|---|
| | 1 | 2 | 3 | 4 | 5 | 6 | 7 |
| Evaluation of Appearance of Clear Ink | ○ | ○ | ○ | ○ | ○ | ○ | ○ |
| Evaluation of Cloudy Point | ○ | ○ | ○ | ○ | ○ | ○ | ○ |
| Evaluation of Fixation 1 | ○ | ○ | ○ | ○ | ○ | ○ | Δ |
| Evaluation of Fixation 2 | ○ | ○ | ○ | ○ | ○ | ○ | Δ |
| Evaluation of Stability 1 | ○ | ○ | ○ | ○ | ○ | ○ | ○ |
| Evaluation of Stability 2 | ○ | ○ | ○ | ○ | ○ | ○ | ○ |
| Evaluation of Stability 3 | ○ | ○ | ○ | ○ | ○ | ○ | ○ |
| Evaluation of Ejection 1 | ○ | ○ | ○ | ○ | ○ | ○ | ○ |
| Evaluation of Ejection 2 | ○ | ○ | ○ | ○ | ○ | ○ | ○ |
| Evaluation of Ejection 3 | ○ | ○ | ○ | ○ | ○ | ○ | ○ |
| Evaluation of Ejection after Standing | ○ | ○ | ○ | ○ | ○ | ○ | ○ |
| Evaluation of Print Quality | ○ | ○ | ○ | ○ | ○ | ○ | ○ |
| Evaluation of Water Resistance | ○ | ○ | ○ | ○ | ○ | ○ | ○ |

Evaluation of the cloudy point in the Examples leads to determination of whether micromicelles are formed or not. It can be understood from Table 3 that Examples 1 to 6 in which a surfactant having an HLB of 10 to 13 was combined with a surfactant having an HLB equal to or greater than 6 and less than 10 are further preferable as described previously.

TABLE 4

Results of Evaluation in Comparative Examples

| | Comparative Examples | | | | | | | |
|---|---|---|---|---|---|---|---|---|
| | 1 | 2 | 3 | 4 | 5 | 6 | 7 | 8 |
| Evaluation of Appearance of Clear Ink | x | x | x | x | x | x | x | x |
| Evaluation of Cloudy Point | — | — | — | — | — | — | — | — |
| Evaluation of Fixation 1 | x x | x x | x | x x | x x | x | x x | Δ |
| Evaluation of Fixation 2 | x | x x | x | x x | x x | x | x x | Δ |
| Evaluation of Stability 1 | ○ | Δ | Δ | ○ | Δ | Δ | ○ | ○ |
| Evaluation of Stability 2 | ○ | Δ | Δ | ○ | Δ | Δ | ○ | ○ |
| Evaluation of Stability 3 | ○ | Δ | Δ | ○ | Δ | Δ | ○ | ○ |
| Evaluation of Ejection 1 | ○ | Δ | ○ | ○ | Δ | ○ | ○ | ○ |
| Evaluation of Ejection 2 | ○ | Δ | ○ | ○ | Δ | ○ | ○ | ○ |
| Evaluation of Ejection 3 | ○ | x | ○ | ○ | Δ | ○ | ○ | ○ |
| Evaluation of Ejection after Standing | ○ | Δ | ○ | Δ | Δ | Δ | ○ | Δ |
| Evaluation of Print Quality | Δ | Δ | Δ | ○ | Δ | Δ | ○ | x |
| Evaluation of Water Resistance | ○ | ○ | ○ | ○ | ○ | ○ | ○ | x |

The cloudy point in the Comparative Example was not measured because the clear ink was already cloudy, and therefore no measurements were needed.

This application claims priority from Japanese Patent Application No. 2003-412848 filed Dec. 11, 2003, which is hereby incorporated by reference herein.

What is claimed is:

1. An aqueous ink comprising micromicelles comprised of:
two or more surfactants forming micelles in an opaque or translucent dispersed state in water when used in conjunction, wherein the two or more surfactants comprise a first surfactant having an HLB equal to or greater than 6 and less than 10 and a second surfactant having an HLB of 10 to 15, wherein the first and second surfactants have the structurally same hydrophobic group unit, and wherein each of the first and second surfactants has an ethylene oxide unit or propylene oxide unit; and
a compound having an alkyl group which is different from the hydrophobic group unit of the first and second surfactants and is less hydrophobic than the hydrophobic group unit of the first and second surfactants,
wherein the compound has only a hydroxyl group as a water-soluble group,
wherein the first surfactant comprises a compound represented by formula (I) and the second surfactant comprises a compound represented by formula (I), wherein formula (I) is as follows:

$$A\text{—}C\equiv C\text{—}B \tag{I}$$

wherein A and B are each independently selected from the group consisting of a hydrogen atom, and groups expressed by the following general formulae $(II_A)$ and $(II_B)$

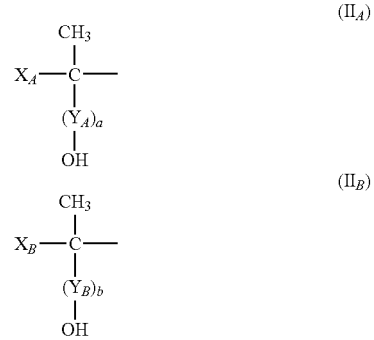

wherein $X_A$ represents $C_nH_{2n+1}$ (n is an integer number of 1 to 10), $X_B$ represents $C_mH_{2m+1}$ (m is an integer number of 1 to 10), $Y_A$ and $Y_B$ represent a ring-opened ethylene oxide unit and/or a ring-opened propylene oxide unit, and a and b are each independently an integer number, and wherein the compound having an alkyl group is a compound represented by formula (III)

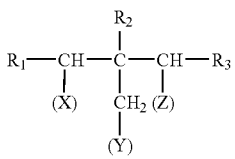

wherein $R_1$, $R_2$, and $R_3$ each independently represent a hydrogen atom or an alkyl group having 1 to 16 carbon atoms, (X), (Y) and (Z) each independently represent OH or D-OH, and D represents a ring-opened ethylene oxide and/or a ring-opened propylene oxide.

2. The aqueous ink according to claim 1, wherein the two or more surfactants each have as a water-soluble group ethylene oxide having a hydroxyl group at the terminal.

3. An aqueous ink having a coloring material, comprising micromicelles comprised of:

two or more surfactants forming micelles in an opaque or translucent dispersed state in water when used in conjunction, wherein the two or more surfactants comprise a first surfactant having an HLB equal to or greater than 6 and less than 10 and a second surfactant having an HLB of 10 to 15, wherein the first and second surfactants have the structurally same hydrophobic group unit, and wherein each of the first and second surfactants has an ethylene oxide unit or propylene oxide unit; and a compound having an alkyl group which is different from the hydrophobic group unit of the first and second surfactants and is less hydrophobic than said hydrophobic group unit of the first and second surfactants, wherein the compound has only a hydroxyl group as a water-soluble group, wherein the first surfactant comprises a compound represented by formula (I) and the second surfactant comprises a compound represented by formula (I), wherein formula (I) is as follows:

wherein A and B are each independently selected from the group consisting of a hydrogen atom, and groups expressed by the following general formulae $(II_A)$ and $(II_B)$

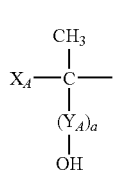

-continued

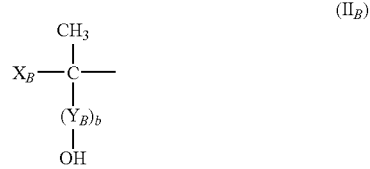

wherein $X_A$ represents $C_nH_{2n+1}$ (n is an integer number of 1 to 10), $X_B$ represents $C_mH_{2m+1}$ (m is an integer number of 1 to 10), $Y_A$ and $Y_B$ represent a ring-opened ethylene oxide unit and/or a ring-opened propylene oxide unit, and a and b are each independently an integer number, and wherein the compound having an alkyl group is a compound represented by formula (III)

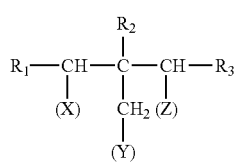

wherein $R_1$, $R_2$, and $R_3$ each independently represent a hydrogen atom or an alkyl group having 1 to 16 carbon atoms, (X), (Y) and (Z) each independently represent OH or D-OH, and D represents a ring-opened ethylene oxide and/or a ring-opened propylene oxide.

4. The aqueous ink according to claim 3, wherein the coloring material is a water-disperse coloring material.

5. The aqueous ink according to claim 3, wherein the coloring material has as a water-soluble group a carboxyl group in its free acid state.

6. The aqueous ink according to claim 3, wherein the two or more surfactants each have as a water-soluble group ethylene oxide having a hydroxyl group at the terminal.

7. The aqueous ink according to claim 6, wherein the two or more surfactants are nonionic.

8. The aqueous ink according to claim 2, wherein the first surfactant insoluble in water has a solubility or dispersibility of 0.1% by weight based on the weight of the water.

9. The aqueous ink according to claim 1, wherein the two or more surfactants are liquid.

10. The aqueous ink according to claim 3, wherein the compound is a sugar alcohol having an alkyl group.

11. The aqueous ink according to claim 3, wherein the compound is solid at ordinary temperatures.

12. An inkjet recording method in which the aqueous ink according to any of claims 1 and 2 to 11 is ejected through orifices as an ink droplet in response to a recording signal to carry out recording on a recording medium to obtain a recorded matter.

13. The inkjet recording method according to claim 12, wherein heat energy is applied to eject ink droplets for formation of the ink droplet.

14. An ink cartridge comprising an ink-containing section containing the aqueous ink according to any of claims 1 and 2 to 11.

15. A recorded matter wherein the recorded matter is formed by providing the aqueous ink according to any of claims 1 and 2 to 11 onto a recording medium.

* * * * *